United States Patent Office 3,519,613
Patented July 7, 1970

3,519,613
POLYMERIZATION OF ETHYLENE USING A CATALYST COMPOSED OF AN INORGANIC VANADIUM COMPOUND AND A HALOGENATED ORGANO-ALUMINUM COMPOUND
Kohei Nakaguchi, Osaka, Shohachi Kawasumi, Niihama-shi, Takezo Sano, Ibaraki-shi, Keiju Ueda and Tomozumi Nishikida, Niihama-shi, Kenichi Maemoto, Ibaraki-shi, Yoshikazu Fujii, Takatsuki-shi, and Koichi Harada, Ibaraki-shi, Japan, assignors to Sumitomo Chemical Company, Ltd., Osaka, Japan, a corporation of Japan
No Drawing. Filed Mar. 28, 1966, Ser. No. 537,637
Claims priority, application Japan, Mar. 31, 1965, 40/18,823
Int. Cl. C08f 1/66, 3/06
U.S. Cl. 260—94.9                    2 Claims

ABSTRACT OF THE DISCLOSURE

A method for the homopolymerization of ethylene and for the copolymerization of ethylene with other olefinic comonomers, using a catalyst consisting of a vanadium phosphate, the mean valency of the vanadium atom of said phosphate being not less than 4 and less than 5, and a halogenated organo-aluminum compound represented by the formula, $R_nAlX_{3-n}$, wherein R is a hydrocarbon radical having 1 to 8 carbon atoms, X is a halogen atom and $n$ is a number higher than 0 and lower than 3.

---

This invention relates to a method for manufacturing a solid high polymer by polymerizing ethylene alone or together with other olefinic comonomers, particularly relating to an excellent catalyst therefor.

The solid high polymer of ethylene has been widely utilized already. In virtue of its excellent chemical and physical properties, its molding products and fibers are of high practical value. Accordingly the development of its profitable manufacturing method has been a great concern to those who participate in the art.

For obtaining the high polymer of ethylene, a high pressure polymerization method using a radical initiator, a low pressure polymerization method using the reaction product of a halide of a transition metal with an organo-metallic compound, and a medium pressure polymerization method using an oxide of a transition metal as the main component of its catalyst, have been established as the commercial methods. They have excellent characteristics respectively but are not as yet satisfactory in some points. For example, since the high pressure polymerization method requires a reaction pressure above 1000 atm., its reactor needs to be highly pressure-resistant and is extremely dangerous in case of emergency. As to the low pressure polymerization method, for which a catalyst prepared by mixing titanium tetrachloride and an aluminum alkyl compound is considered the most effective, the activity of the catalyst fluctuates widely depending on the conditions and the method of mixing its components, while the activity decreases sharply with the lapse of time during the reaction and the catalyst has a comparatively short life. On the other hand, of the medium pressure polymerization methods, a method using a molybdenum oxide-alumina catalyst (U.S. Pat. No. 2,691,647; Standard Oil Co.) and one using a chromium oxide-silica-alumina catalyst (Japanese patent publication No. 2,491/1957; Phillips Petroleum Co.) are typical and those catalysts are durable and highly stable but have lower catalytic activities than those of the low pressure polymerization method.

According to the method described in the Japanese Pat. No. 412,866, it is disclosed that olefins can be polymerized using a catalyst consisting of vanadyl orthophosphate and a hydride or an organometallic compound of a metal belonging to Groups I–III of the Mendeleev's Periodic Table as a catalyst. In this method, however, the efficiency of the catalyst is not high. For example, with regard to polymerization of ethylene, as it is evident in Examples 1 and 2 thereof, the polymer can be obtained in an amount of less than 10 times of the amount of vanadyl orthophosphate.

One object of this invention is to provide an improved method for polymerizing ethylene which is free from the above-mentioned defects, that is, requiring no high pressure and using such a catalyst system that has a high activity, comparable with that of the catalyst of the low pressure method, and high stability and high durability, comparable with or superior to that of the medium pressure method. Another object of this invention is to provide a method for polymerizing ethylene in which the catalyst residue can be removed easily from the product.

Further an additional object of this invention is to provide a method for controlling the molecular weight of the produced polymer easily.

According to the method of the present invention, ethylene alone or together with other olefins are put in contact with the catalyst which consists of a vanadium phosphate, the mean valency of the vanadium atom of which is not less than 4 and less than 5, and a substance having a means composition formula of $R_nAlX_{3-n}$ wherein R is a hydrocarbon radical having 1 to 8 carbon atoms, X is a halogen and $n$ is a number higher than 0 and lower than 3, including a mixture of an organoaluminum compound and a halogenated aluminum compound.

The catalyst used in this invention consists essentially of two components, namely a vanadium phosphate and a halogenated organoaluminum compound. For convenience the former is hereinafter called the first catalyst component and the latter the second catalyst component.

As the first catalyst component, a vanadium phosphate having a composition expressed in a general formula of $(V_2O_Y)(P_2O_5)_Z$ is used, wherein Y represents the mean valency of the vanadium atom, is a number, not less than 4 and less than 5 and Z is a positive number less than 10. Vanadium phosphates expressed in this formula include the partially reduced products of pentavalent vanadium salts of various phosphoric acids and the partially reduced products of vanadyl salts of various phosphoric acid, containing penta-valent vanadium. For example, the partially reduced product of vanadyl (V) orthophosphate can be illustrated as typical. This can be expressed in a composition formula of $V_2O_Y \cdot P_2O_5$, which corresponds to the above-mentioned general formula with $Z=1$. Besides, the partially reduced products of the vanadyl (V) salts of condensed phosphoric acids, such as vanadyl (V) pyrophosphate, vanadyl (V) metaphosphate and vanadyl (V) polyphosphate can also be used similarly. In those compounds, the mean valency of vanadium needs to be not less than 4 and less than 5.

In the present invention, the above-mentioned vanadium phosphates alone are generally used as the first catalyst component but if necessary, supported vanadium phosphates on an oxide or a phosphate of a metal other than vanadium may be used. Those supported catalysts are prepared by mixing method, co-precipitating method or depositing method.

According to the present invention the first catalyst component may be synthesized by various methods. For example, it may be obtained easily by preparing a penta-valent vanadium phosphate and then reducing the same.

The penta-valent vanadium phosphate can be synthesized by reaction of a penta-valent vanadium compound with phosphoric acid or a phosphate. As the penta-valent vanadium compound, vanadium pentoxide, vanadyl (V) trichloride and metavanadates such as ammonium metavanadate and sodium metavanadate or vanadic acid esters such as ethyl vanadate may be used. As phosphoric acid, orthophosphoric acid, and condensed phosphoric acids such as metaphosphoric acid, pyrophosphoric acid and polyphosphoric acid may be used. As the phosphates, ammonium salts and various metal salts of phosphoric acid may be used and especially the phosphates soluble in water or acids are preferable. The above-mentioned reaction can be carried out not only in a solvent, such as water and alcohol, but alo directly without a solvent at room temperature or on heating. For example, vanadatophosphoric acid can be obtained by reacting phosphoric acid containing a small amount of water with vanadium pentoxide. This is a crystalline substance having the following structural portion:

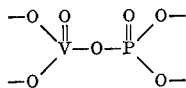

The first catalyst component is obtained by reducing a penta-valent vanadium phosphate produced by the above-mentioned method. The reduction can be attained by heating it in various reducing atmosphere. For example the reduction can be carried out so as to give a mean valency of vanadium atom substantially not less than 4 and less than 5 by heating it in the current of hydrogen, carbon monoxide or sulfur dioxide. The heating temperature and time must be selected properly depending on the kind of the reducing atmosphere. If the heating is carried out in the current of hydrogen at more than 500° C. for a long time, the reduction sometimes proceeds too much, and the catalytic activity is lowered. Care should be taken of the selection of the heating condition when an inorganic reducing gas is used. On the other hand, it has been found that the reduction can be achieved easily as required by heating a penta-valent vanadium phosphate in the presence of an organic compound and the first catalyst component having a high activity can always be thereby obtained. As the organic compounds, various organic compounds may be used, such as hydrocarbons like benzene and toluene, alcohols like methanol, ethanol, propanol and butanol, aldehydes like formaldehyde and benzaldehyde and aldehyde polymers like paraformaldehyde, paraldehyde and trioxane. In this case, the penta-valent vanadium phosphate is dipped or immersed in the organic compound or impregnated or mixed with the organic compound and dried and then heat-treated. The heating is carried out at a temperature ranging from 250° to 600° C. in the air or an inert gas.

The mean valency of the vanadium atom in the first catalyst component thus obtained can be determined quantitatively spectro-photometry, the polarography or the oxidation-reduction titration method.

The mean valency of the vanadium atom in the first catalyst component is characteristically not less than 4 and less than 5. This means that the first catalyst component consists mainly of tetra- and penta-valent vanadium phosphates. In the case of the mean valency of the vanadium atom being 5, that is, not containing tetravalent vanadium atom, the efficiency of the catalyst is lower than otherwise, while if it is less than 4, the efficiency of the catalyst may not only decrease to some extent but also the residue of the catalyst is insoluble in acids and can be removed from the produced polymer with difficulty. In the present method, the residue of the catalyst is soluble in acids and can be removed from the produced polymer by acid treatment after the polymerization is finished. In the conventional medium pressure method for polymerization of ethylene using a metal oxide catalyst, the catalyst component is insoluble in acids, hence the polymer in a molten state or in solution must be separated from the residue of the catalyst by centrifuge or filtration. In comparison with this, its removal by acid treatment is very advantageous.

As the second catalyst component, a compound or composition containing both halogen-aluminum bond and carbon-aluminum bond is effective especially. That is, as the second catalyst component, a halogenated organoaluminum compound or a mixture of an organo-aluminum compound and a halogenated aluminum compound are used. This is a compound or composition which can be generally expressed in the mean composition formula of $R_nAlX_{3-n}$, wherein R is an aliphatic or aromatic hydrocarbon radical having 1 to 8 carbon atoms, X is a halogen and $n$ is a number higher than 0 and lower than 3.

The halogenated organoaluminum compounds include dialkyl aluminum halide, diphenyl aluminum halide, alkyl aluminum sesquihalide, alkyl aluminum dihalide and phenly aluminum dihalide. As the examples of their compounds, diethyl aluminum chloride, diisobutyl aluminum chloride, diisobutyl aluminum bromide, diisobutyl aluminum iodide, ethyl aluminum sesquichloride, ethyl aluminum dichloride, diphenyl aluminum chloride and the like are illustrated.

Further, as the second component, a mixture of an organo-aluminum compound and a halogenated aluminum compound are also used, for example, a mixture of trialkyl aluminum and a halogenated aluminum can be used. Of course, mixtures of the above-mentioned various halogenated organo-aluminum compounds and a halogenated aluminum or a trialkyl aluminum are useful. As the trialkyl aluminum, for example, triethyl aluminum, tributyl aluminum and trihexyl aluminum are used and as the halogenated aluminum, aluminum chloride, aluminum bromide and aluminum iodide are used.

As to the amount of each catalyst component, it is selected according to the capacity of the reactor, the amount of the solvent and the reaction temperature and pressure, but it is suitable that the first catalyst component is used by 0.1–10 (wt.) parts and the second by 0.5–50 (wt.) parts against 1,000 (wt.) parts of charged ethylene.

The catalyst used in the present method consists of the above-mentioned two components but its activity can be improved by adding the third component selected from alcohols, ethers, amines, alkali metal halides and others by such a molar amount as does not exceed the molar amount of the second catalyst component.

According to the method of the present invention, ethylene is polymerized by being contacted alone or, in the presence of other olefins with the mixture of the above-mentioned two catalyst components. This polymerization can be carried out without a diluent but it is generally preferable to carry out it in the presence of a diluent. As the diluent, aliphatic, alicyclic and aromatic hydrocarbons and halogenated hydrocarbons are used, for example, propane, n-butane, n-pentane, n-heptane, n-octane, iso-octane, cyclohexane, methylcyclohexane, benzene, toluene, xylene, tetralin, decalin, monochlorobenzene, tetrachloroethylene and carbon tetrachloride. These diluents can be used alone but a mixture of two or more of them are also useful. For example, each fraction of petroleum, such as gasoline, kerosene or naphtha can be used without further processing. But it is desirable to eliminate previously from those diluents polar impurities which contain such elements as O, N and S which can react with the catalyst.

The polymerization is carried out at a reaction temperature of 0°–300° C., preferably 30°–180° C. and at an ethylene pressure of 1–200 kg./cm.$^2$, preferably 5–100 kg./cm.$^2$. At 0°–100° C., the catalyst is preferably suspended in a diluent. In this case, the polymer separates in form of a slurry. At 120°–300° C., the polymer is dissolved in a diluent as polymerization proceeds, so it is a solution process. In this case, the catalyst may be suspended or it can be supported on a carrier, that is, the polymerization can be carried out on a fixed bed. Further it can be carried out batch-wise or continuously.

According to the method of the present invention, olefins other than ethylene can be likewise polymerized to homopolymer. But the rate of homopolymerization of 1-alkene having 3 or more carbon atoms is much lower than that of polymerization of ethylene. But copolymerization of ethylene and mono-olefins such as 1-alkenes having 3 or more carbon atoms or diolefins can be carried out easily. For example, copolymerization of ethylene with propylene, butene-1, 3-methylbutene-1, octene-1 or hexadecene-1 can be done. Polyolefin of various grades, having an excellent processability and various physical properties can be produced by copolymerizing small amounts of the above-mentioned 1-alkenes with ethylene. Further a resinous copolymer capable of forming cross-linkage can be obtained by copolymerizing a small amount of a linear or cyclic diolefin with ethylene. For example, ethylene can be copolymerized with butadiene, piperylene, isoprene, 1,5-hexadiene, cyclo-octadiene, di-cyclopentadiene or vinyl cyclohexene. Further it can be copolymerized with styrene or its derivatives.

After the polymerization is finished, the residue of the catalyst can be easily removed by separating the produced solid and treating it with a mixture of alcohol and acid. But when a carrier or metal compound, insoluble in acids, is used together with the first component, it is necessary to dissolve the produced solid by heating in a solvent like a hydrocarbon and then remove the residue of the catalyst by a method known in the art such as centrifugal separation or filtration.

According to the method of the present invention, the homopolymer or copolymer of ethylene which has a very high molecular weight can be obtained. That having average molecular weight of 300 thousand-5 million or more can be produced easily. This very high molecular weight polyethylene is suitable particularly for such applications that require high impact resistance, abrasion resistance and anti-corrosion. For example, it is suitable for making parts of machines and building materials. But this kind of the high molecular weight polymer in molten state has such little fluidity that it cannot be molded by conventional injection- or extrusion-molding method. Compression-molding is used for such grades of polyethylene. If necessary, it is preferable to utilize it by degrading by pyrolysis or oxydative or mechanical degradation.

On the other hand, the average molecular weight of the produced polymer can be controlled by changing the conditions of polymerization or by effecting in the presence of some suitable chain transfer agents. In particular, by adding suitable amount of molecular hydrogen the polymer of a desired average molecular weight can be obtained easily. Polyethylene, thus obtained, having an average molecular weight of 10–300 thousand is suitable for ordinary injection, extrusion or blow molding or powder molding.

Further, when the micro structure of polyethylene obtained by the method of the present invention was examined by infrared spectroscopy, it was found to contain characteristically a much smaller number of double bonds than polyethylene obtained by the conventional method. That is, only 0.05–0.5, almost always about 0.05–0.2, of double bonds per 1000 carbon atoms are contained in the polymer. Further, the number of methyl groups can be controlled by selection of the catalyst and the reaction condition of polymerization and a homopolymer of ethylene containing less than 1 methyl group per 1000 carbon atoms can be obtained easily. Less methyl group means less branching. The density of the less branched polyethylene is more than 0.950, which corresponds to a very high density polyethylene by the conventional method.

For a clear understanding of the present invention, the following specific examples are given. These examples are intended to be merely illustrative of the invention and not in limitation thereof. Parts by weight are used throughout.

EXAMPLES 1–6

In a glass vessel, 36.4 parts of vanadium pentoxide and 92.0 parts of orthophosphoric acid (85%) were mixed well at room temperature in the atmosphere of nitrogen and allowed to stand for three days to be reacted. A yellow solid product thus obtained was a vanadium phosphate containing penta-valent vanadium but was contaminated with excessive phosphoric acid. The product was divided into six portions, which were washed respectively with water, water, methanol, ethanol, isopropanol and isobutanol to remove the excessive phosphoric acid and then dried at a reduced pressure at 70° C. for 2 hours. Further, to the two specimens obtained by washing with water, paraformaldehyde and trioxane, each by 5 (wt.) percent, were added, respectively and mixed well with. The mixtures thus obtained were dried in an electric furnace and heated at 400° C. for 5 hours while dry air was being passed through it. The product was a vanadium phosphate having a composition of $V_2O_Y \cdot P_2O_5$. The mean valency Y of the vanadium atom measured by oxidation-reduction titration was all found to be not less than 4 and less than 5.

Into a stainless steel autoclave of an electromagnetically rotating agitation type, having an capacity of 500 ml., 0.1 g. of the vanadium phosphate obtained as above was charged and after it was flashed with ethylene at a reduced pressure, 10 millimols of ethyl-aluminum dichloride or diethyl aluminum chloride, together with 250 ml. of n-heptane, was charged and ethylene was introduced at a pressure up to 40 kg./cm.$^2$. Ethylene being supplied for maintaining the constant pressure according to the reaction, it was carried out for 3 hours. Then unreacted ethylene was vented, and the solid product was separated, from which the residue of the catalyst was removed by adding a 1:1 (vol.) mixture of methanol and hydrochloric acid in a sufficient amount to the product and by heating under agitation. After the product was washed by methanol several times, it was dried at 50° C. at a reduced pressure for one night. The result was as shown in Table 1. The ratio of the polymer yield to the amount of the first catalyst component is much greater than those in the examples described in the Japanese Pat. No. 412,866.

TABLE 1

| Examples | 1 | 2 | 3 | 4 | 5 | 6 |
|---|---|---|---|---|---|---|
| Preparation of the first catalyst component |  |  |  |  |  |  |
| Organic compound | Methanol | Ethanol | Isopropanol | Isobutanol | Paraformaldehyde. | Trioxane. |
| Initial existing amount of the above before heating. | 15.0 | 16.0 | 8.0 | 8.5 | 5.0 | 5.0. |
| Mean valency of vanadium in the product. | 4.89 | 4.55 | 4.97 | 4.94 | 4.93 | 4.97. |
| The second component | Ethyl aluminum dichloride. | Ethyl aluminum dichloride. | Ethyl aluminum dichloride. | Ethyl aluminum dichloride. | Diethyl aluminum chloride. | Diethyl aluminum chloride. |
| The polymer: |  |  |  |  |  |  |
| Yield (g.) | 44.2 | 33.1 | 41.1 | 38.3 | 25.1 | 17.9. |
| Intrinsic viscosity (dl./g.) (xylene, 120° C.) | 21.9 | 22.1 | 21.0 | 20.9 | 13.6 | 14.2. |
| Number of double bonds (per 1,000 carbon atoms). | 0.09 | 0.08 | 0.05 | 0.08 | 0.12 | 0.21. |

EXAMPLES 7–11

A penta-valent vanadium phosphate prepared in the same way as in Examples 1–6 was heated under various conditions. The heat-treated product was used by 0.2 g. 1.2 g. of diethyl aluminum chloride was used as the second component and 150 ml. of n-heptane as the diluent. The polymerization was carried out at a reaction temperature of 70° C. and at a ethylene pressure of 40 kg./cm.$^2$ for 3 hours. As the reactor, a stainless steel autoclave of an electromagnetic vertical agitation type, having a capacity of 300 ml., was used. The result was as shown in Table 2.

TABLE 2

| Examples | 7 | 8 | 9 | 10 | 11 |
|---|---|---|---|---|---|
| Preparation of the first catalyst component: | | | | | |
| Organic compound | | | Methanol | Methanol | Methanol |
| Initial existing amount of the above before heating | | | 17 | 17 | 17 |
| Atmosphere | H$_2$ | H$_2$ | N$_2$ | N$_2$ | Air |
| Temperature, ° C | 300 | 350 | 400 | 300 | 300 |
| Time (hr.) | 5 | 5 | 5 | 5 | 5 |
| Mean valency of vanadium in the product | 4.76 | 4.19 | 4.52 | 4.84 | 4.90 |
| Polymer: | | | | | |
| Yield (g.) | 24.5 | 29.6 | 25.2 | 27.6 | 25.3 |
| Intrinsic viscosity (dl./g.) (xylene, 120° C.) | 11.3 | 9.6 | 11.3 | 12.4 | 13.1 |

EXAMPLES 12–17

The experiments were run in the same way as in Example 1, excepting that only the second component was varied. The result was as shown in Table 3.

TABLE 3

| Examples | Second catalyst component | Amount (g) | Yield (g.) | Intrinsic viscosity (xylene, 120° C.) |
|---|---|---|---|---|
| 12 | Ethyl aluminum sesquichloride | 1.2 | 38.5 | 16.4 |
| 13 | Equimolar mixture of ethyl aluminum dichloride-aluminum chloride | 1.3 | 17.7 | 8.8 |
| 14 | 2:1 molar ratio mixture of triethyl aluminum-aluminum bromide | 1.6 | 7.8 | 12.2 |
| 15 | Ethyl aluminum sesquichloride | 1.9 | 9.3 | 12.2 |
| 16 | Diethyl aluminum iodide | 2.1 | 14.4 | 8.7 |
| 17 | Diisobutyl aluminum chloride | 1.7 | 26.3 | 13.1 |

EXAMPLES 18–21

Using as the first catalyst component a vanadium phosphate (the mean valency of vanadium: 4.84) obtained in the same way as in Example 1, the polymerization was carried out in various diluents. The reactor had a capacity of 300 ml. and the amount of diluent was 150 ml. As for the polymerization condition, a temperature of 70° C., an ethylene pressure of 40 kg./cm.$^2$ and a reaction time of 3 hours were applied. The result was as shown in Table 4.

EXAMPLE 22

11.6 parts of vanadium pentoxide and 17.3 parts of polyphosphoric acid were mixed well in the atmosphere of nitrogen. The resultant mixture was heated at 70° C. for 13 hours and again at 90° C. for 7 hours. The product was washed well with methanol and then dried preliminarily at 70° C. for several hours. About 25 (wt.) percent of methanol remained in it. It was heated at 400° C. for 5 hours in an electric furnace while dry air was being passed through it. The mean valency of vanadium in the product was 4.53.

0.2 g. of the above-mentioned product, together with 1.2 g. of diethyl aluminum chloride and 150 ml. of n-heptane, was charged into the reactor (capacity: 300 ml.). The polymerization reaction was carried out at a reaction temperature of 50° C. at an ethylene pressure of 40 kg./cm.$^2$ for 3 hours. Polyethylene was obtained by 7.9 g.

EXAMPLE 23

11.7 parts of ammonium vanadate and 11.5 parts of orthophosphoric acid were mixed well and then reacted at room temperature for 5 days. The reaction product was washed with methanol, dried preliminarily and then heated in air at 400° C. for 5 hours. The heated product was dark yellow green powder. The mean valency of vanadium was 4.45. Using this substance, ethylene was polymerized in the same way as in Example 22 excepting the reaction temperature of 80° C. Polyethylene was obtained by 15.9 g.

EXAMPLES 24–27

Ethylene was homopolymerized in the presence of hydrogen under the following conditions.

Capacity of the reactor—300 ml.
The first component of the catalyst—Vanadium phosphate (the mean valency of vanadium being 4.8), 0.2 g.
The second component of the catalyst—Diethyl aluminum chloride, 1.2 g.
Diluent—n-heptane, 150 ml.
Reaction temperature—70° C.
Ethylene, partial pressure—40 kg./cm.$^2$.
Reaction time—3 hours.

TABLE 4

| Examples | 18 | 19 | 20 | 21 |
|---|---|---|---|---|
| The first component of the catalyst (g.) | 0.1 | 0.1 | 0.2 | 0.2 |
| The second component of the catalyst | Ethyl aluminum dichloride | Ethyl aluminum dichloride | Diethyl aluminum chloride | Diethyl aluminum chloride |
| Amount (g.) | 1.3 | 1.3 | 1.2 | 1.2 |
| Diluent | Benzene | Toluene | Tetralin | Tetracholoroethylene |
| Yield of the polymer (g.) | 2.8 | 2.3 | 4.9 | 18.6 |
| Intrinsic viscosity of the polymer (dl./g.) (xylene, 120° C.) | 7.6 | 7.1 | 15.9 | 12.0 |

The added amount of hydrogen was varied. The result was as shown in Table 5.

TABLE 5

| Examples | 24 | 25 | 26 | 27 |
|---|---|---|---|---|
| Added amount of $H_2$ (l.) | 0.11 | 0.22 | 2.2 | 11.2 |
| Polymer: | | | | |
| Yield (g.) | 18.5 | 15.8 | 7.7 | 5.6 |
| Ash content (percent) | 0.021 | 0.016 | 0.011 | 0.035 |
| Intrinsic viscosity (dl./g.) (xylene, 120° C.) | 9.5 | 8.0 | 3.1 | 1.6 |
| Mean molecular weight [1] ×10⁻⁴ | 80 | 66 | 19 | 8 |
| Stress at break (kg./cm.²) | 307 | 314 | 254 | 235 |
| Elongation at break (percent) | 465 | 513 | 570 | 970 |
| Density (g./cc.) | 0.9323 | 0.9372 | 0.9462 | 0.9525 |

[1] The mean molecular weight was calculated using the following equation proposed by Duch and Küchler:

$$[\eta] = 2.36 \times 10^{-4} \bar{M}_w^{0.78}$$ (Z. Electrochem. 60, 218 (1956))

EXAMPLE 28

Using 0.1 g. of a vanadium phosphate (the mean valency of vanadium atom being 4.84) obtained in the same way as in Example 1 and 1.0 g. of ethyl aluminum dichloride as the catalyst and 150 ml. of n-heptane as the diluent, ethylene was polymerized at 130° C. at an ethylene pressure of 20 kg./cm.² for 3 hours. The polymerization was carried out in a dissolved state of the produced polymer. After the reaction was finished, the reactor was cooled to lower than 80° C. and then the solid polymer was separated and recovered in a state of flakes. Solid polyethylene having an intrinsic viscosity of 6.4 dl./g. was obtained by 2.7 g.

EXAMPLES 29–31

Using 0.2 g. of a vanadium phosphate obtained in the same way as in Example 1 as the first component and 150 ml. of n-heptane as the diluent, ethylene and other kinds of olefins were copolymerized at a reaction temperature of 70° C. at an ethylene partial pressure of 40 kg./cm.². The results was as shown in Table 6. In the case of adding propylene or butene-1, the number of methyl groups in the polymer obtained by the copolymerization increased. In the case of adding butadiene, the rate of polymerization fell but the number of double bonds in the polymer by the copolymerization increased.

TABLE 6

| Examples | 29 | 30 | 31 |
|---|---|---|---|
| The second component of the catalyst | ([1]) | ([2]) | ([2]) |
| Amount (g.) | 1.3 | 1.2 | 1.2 |
| Co-existing olefin added | Propylene | Butene-1 | Butadiene |
| Amount (g.) | 4.2 | 5.6 | 2.7 |
| Polymer | | | |
| Yield (g.) | 4.6 | 13.5 | 1.3 |
| Intrinsic viscosity (dl./g.) (xylene, 120° C.) | 9.5 | 11.1 | 9.9 |
| Density (g./cc.) | 0.9205 | 0.9213 | 0.9368 |
| Number of $CH_3$ groups per 1,000 carbon atoms | 26 | 5.6 | <1 |
| Number of double bonds per 1,000 carbon atoms | 0.2 | 0.2 | 2.8 |

[1] Ethyl aluminum dichloride.
[2] Diethyl aluminum chloride.

What is claimed is:

1. A method for polymerizing ethylene alone or together with other olefinic comonomers, which comprises contacting ethylene alone or together with other olefinic comonomers with a catalyst consisting of a vanadium phosphate, having a composition represented by the general formula, $(V_2O_Y)(P_2O_5)_Z$, in which Y represents the mean valency of the vanadium atom and is a number not less than 4 and less than 5 and Z is a positive number less than 10, and a substance having a mean composition formula of $R_nAlX_{3-n}$, wherein R is a hydrocarbon radical having 1 to 8 carbon atoms, X is a halogen atom and $n$ is a number higher than 0 and lower than 3.

2. A method for polymerizing ethylene alone or together with other olefinic comonomers, which comprises contacting ethylene alone or together with other olefinic comonomers with a catalyst consisting of a vanadium phosphate, having a composition represented by the general formula, $(V_2O_Y)(P_2O_5)Z$, in which Y represents the mean valency of the vanadium atom and is a number not less than 4 and less than 5 and Z is a positive number less than 10, and a substance having a mean composition formula of $R_nAlX_{3-n}$, wherein R is a hydrocarbon radical having 1 to 8 carbon atoms, X is a halogen atom and $n$ is a number higher than 0 and lower than 3 in the presence of hydrogen.

References Cited

UNITED STATES PATENTS

| 3,051,690 | 8/1962 | Vandenberg | 260—88.2 |
| 2,996,459 | 8/1961 | Andersen et al. | 260—94.9 |
| 3,221,059 | 11/1965 | Fukui et al. | 252—428 |
| 2,912,419 | 11/1959 | Peters et al. | 260—93.7 |
| 3,156,707 | 11/1964 | Kerr | 252—437 |
| 3,365,405 | 1/1968 | Fukui et al. | 260—2 |

OTHER REFERENCES

Kagiya et al., Chem. Abs. 6931b. v. 60, 1964 [Polymerization of Olefins by catalysts of Metal Phosphates, Kogyo Kagaku Zasshi, 66(b), 841–6 (1963)].

Fukui et al., Chem. Abs. 16002h, v. 60, 1964 [Catalyst for Polymerization of Olefins, Japan 7133 (63), May 27].

Kagiya et al., Chem. Abs., 10071 h–10072 a–e, v. 63, 1965 [Polymerization of Ethylene Oxide, Kyoto Daigaku Nippon Kagaku Seni Kenkyusho Koenshu, 20, 19–36 (1963)].

Sumitomo, Chem. Abs. 3724f, v. 64, 1966 [British 1,009,953].

JOSEPH L. SCHOFER, Primary Examiner

E. J. SMITH, Assistant Examiner

U.S. Cl. X.R.

252—430; 260—85.3, 88.2, 93.7